(12) United States Patent
Peterson et al.

(10) Patent No.: US 10,862,298 B2
(45) Date of Patent: Dec. 8, 2020

(54) DUTY CYCLE MODULATED UNIVERSAL BINARY INPUT CIRCUIT WITH REINFORCED ISOLATION

(71) Applicant: Schweitzer Engineering Laboratories, Inc., Pullman, WA (US)

(72) Inventors: Brian James Peterson, Moscow, ID (US); Tracey G. Windley, Moscow, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 450 days.

(21) Appl. No.: 15/950,964

(22) Filed: Apr. 11, 2018

(65) Prior Publication Data
US 2019/0319452 A1    Oct. 17, 2019

(51) Int. Cl.
H02H 9/04    (2006.01)
H04B 10/80    (2013.01)

(52) U.S. Cl.
CPC .......... *H02H 9/04* (2013.01); *H04B 10/802* (2013.01); *H02H 9/045* (2013.01)

(58) Field of Classification Search
CPC ...... H02H 1/0061; H02H 1/0069; H02H 1/06; H02H 9/04–041; H02H 9/045–046; H02J 13/00019; H02J 13/00036; H02J 13/0004; G01R 15/14; G01R 15/22; G01R 31/2827; G01R 31/327–3274
See application file for complete search history.

(56) References Cited

U.S. PATENT DOCUMENTS

| | | | |
|---|---|---|---|
| 4,025,849 A | 5/1977 | Nihashi |
| 4,197,471 A | 4/1980 | Lackey |
| 4,417,099 A | 11/1983 | Pierce |
| 4,420,784 A | 12/1983 | Chen |
| 4,500,933 A | 2/1985 | Chan |
| 4,562,547 A | 12/1985 | Shauger |
| 4,618,906 A | 10/1986 | Paice |
| 4,652,962 A | 3/1987 | Howell |

(Continued)

FOREIGN PATENT DOCUMENTS

| | | |
|---|---|---|
| EP | 1981167 | 10/2008 |
| EP | 2770641 | 8/2014 |

OTHER PUBLICATIONS

TI Designs, "Digitally Isolated 2-Channel, Wide AC/DC Binary Input Module", Texas Instruments Inc., May 2015.

*Primary Examiner* — Fred E Finch, III
(74) *Attorney, Agent, or Firm* — Justin K. Flanagan

(57) ABSTRACT

According to various embodiments, an intelligent electronic device IED, such as a protective relay, includes a universal binary input circuit for receiving an AC or DC binary input with a voltage magnitude between approximately 0 Volts and 300 Volts. The universal binary input provides reinforced isolation via an input protection subcircuit and an optocoupler for communicating an optical signal with an electrically isolated controller based on the received binary input signal. In one embodiment, a duty cycle modulation subcircuit generates a pulse width modulated drive signal to drive the optocoupler based on the voltage magnitude of the received binary input. The duty cycle of the pulse width modulated drive signal is (linearly or nonlinearly) inversely proportional to the voltage magnitude of the received binary input.

20 Claims, 5 Drawing Sheets

(56) References Cited

U.S. PATENT DOCUMENTS

| | | | |
|---|---|---|---|
| 4,658,320 A | 4/1987 | Chester | |
| 4,704,652 A | 11/1987 | Billings | |
| 4,740,966 A | 4/1988 | Goad | |
| 4,771,403 A | 9/1988 | Maskovyak | |
| 4,949,030 A | 8/1990 | Tse | |
| 5,398,025 A | 3/1995 | Herman | |
| 5,517,378 A | 5/1996 | Asplund | |
| 5,536,980 A | 7/1996 | Kawate | |
| 5,585,678 A * | 12/1996 | Dijk | H01H 9/167 307/112 |
| 5,587,863 A | 12/1996 | Bergstrom | |
| 5,652,688 A | 7/1997 | Lee | |
| 5,675,640 A | 10/1997 | Tappert | |
| 5,751,118 A * | 5/1998 | Mortimer | H05B 41/36 307/21 |
| 5,789,960 A | 8/1998 | Bower | |
| 6,489,748 B1 | 12/2002 | Okamura | |
| 6,816,350 B1 | 11/2004 | Hoopes | |
| 6,820,160 B1 | 11/2004 | Allman | |
| 6,956,725 B2 | 10/2005 | Boughton | |
| 7,557,655 B2 | 7/2009 | Minteer | |
| 7,592,713 B2 | 9/2009 | Bryan | |
| 7,728,749 B2 | 6/2010 | Sahu | |
| 7,746,877 B2 | 6/2010 | Trethewey | |
| 7,778,262 B2 | 8/2010 | Beagley | |
| 7,795,885 B2 | 9/2010 | Gorczyca | |
| 8,009,055 B2 | 8/2011 | Lindsey | |
| 8,276,006 B2 | 9/2012 | Sawyers | |
| 8,477,517 B2 | 7/2013 | Joshi | |
| 8,912,935 B1 * | 12/2014 | Smith | H03K 19/1776 341/137 |
| 2004/0217749 A1 * | 11/2004 | Orr | H02M 3/33569 323/299 |
| 2005/0152439 A1 | 7/2005 | Beij | |
| 2007/0120694 A1 | 5/2007 | Lindsey | |
| 2007/0127177 A1 | 6/2007 | Benton | |
| 2007/0194764 A1 * | 8/2007 | Eriksson | H02P 13/06 323/257 |
| 2008/0204274 A1 | 8/2008 | Peters | |
| 2009/0125124 A1 | 5/2009 | Premerlani | |
| 2010/0177830 A1 | 7/2010 | Dreps | |
| 2010/0265740 A1 * | 10/2010 | Zargari | H02M 1/096 363/17 |
| 2011/0090604 A1 * | 4/2011 | Butler | G05F 1/44 361/18 |
| 2014/0265935 A1 * | 9/2014 | Sadwick | H05B 45/10 315/307 |
| 2014/0312923 A1 * | 10/2014 | Alley | G01R 19/0092 324/713 |
| 2015/0309497 A1 * | 10/2015 | Calvin | H03K 7/08 700/86 |
| 2017/0026043 A1 | 1/2017 | Lazaravich | |
| 2017/0140888 A1 * | 5/2017 | Cordle | H01F 7/1844 |

* cited by examiner

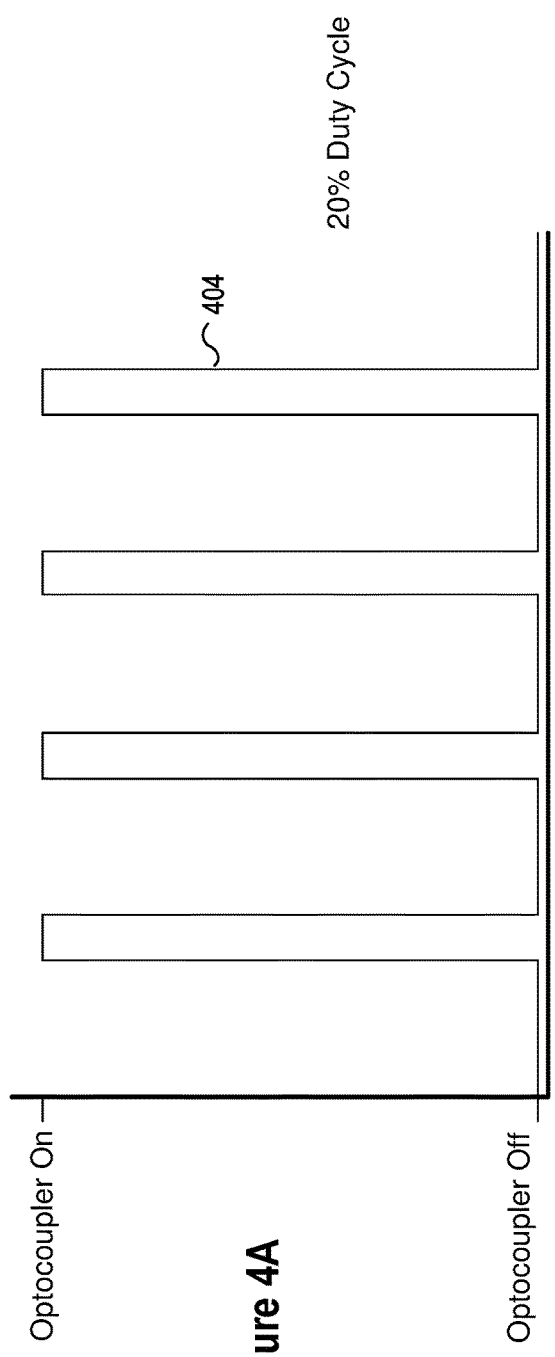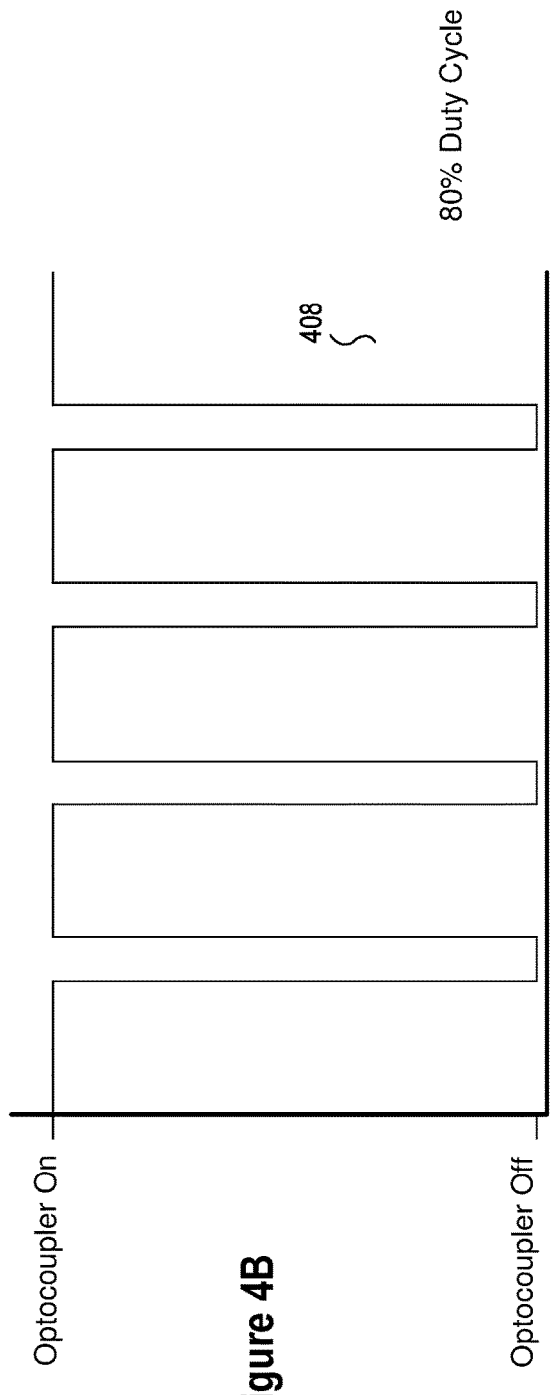
Figure 4A
Figure 4B

DUTY CYCLE MODULATED UNIVERSAL BINARY INPUT CIRCUIT WITH REINFORCED ISOLATION

TECHNICAL FIELD

The present disclosure relates to binary input circuits of protection relays. More specifically, but not exclusively, the embodiments of this disclosure pertain to binary input circuits of protection relays and automation controllers in electric power transmission and distribution systems.

BRIEF DESCRIPTION OF THE DRAWINGS

This disclosure includes various non-limiting and non-exhaustive embodiments. For some embodiments, reference is made to certain illustrative embodiments that are depicted in the figures described below.

FIG. 4A illustrates an example of a low duty cycle output of a pulse-width modulation sub-circuit for driving an optocoupler based on a binary input with a relatively high voltage.

FIG. 4B illustrates an example of a high duty cycle output of a pulse-width modulation sub-circuit for driving an optocoupler based on a binary input with a relatively low voltage.

DETAILED DESCRIPTION

Figure 1:
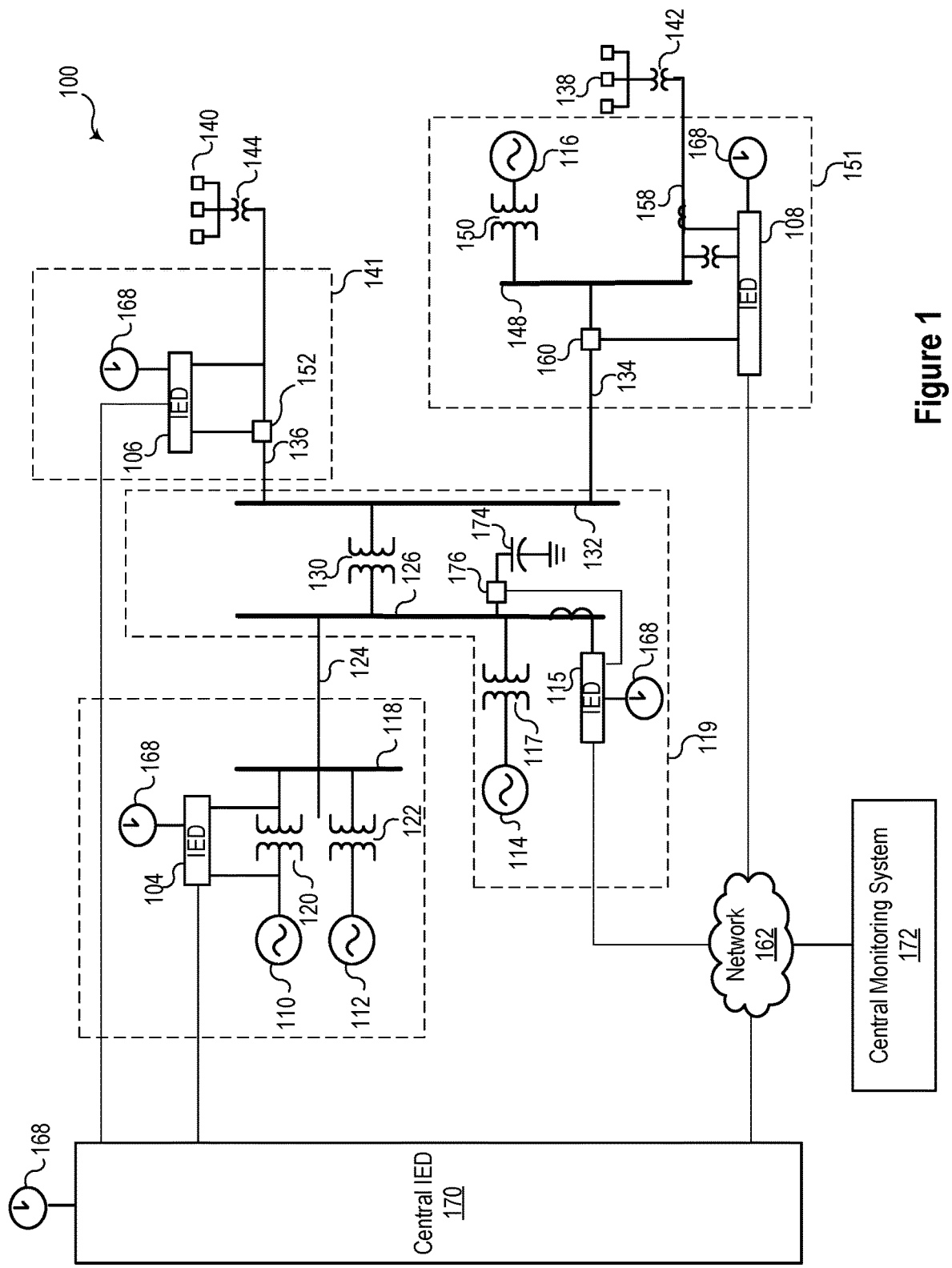
FIG. 1 illustrates an example of a simplified one-line diagram of an electric power transmission and distribution system, according to one embodiment.

Modern electric power systems incorporate a variety of technologies to monitor, protect and/or control distribution and transmission of electric power. Protective relays, monitoring equipment, motor protection relays, real-time automation controllers, and various other intelligent electronic devices (IEDs) may communicate with each other and/or receive information from various components within the electric power system. For example, protective relays may evaluate electrical conditions and implement control actions based on the evaluation.

According to various embodiments, an IED for protecting, monitoring, and/or controlling components within electric distribution and transmission systems may utilize information provided via binary inputs. Other IEDs and may utilize binary inputs as well. Binary inputs, for example, may be used to communicate information regarding the status of circuit breakers, reclosers, alarms, etc. For example, a circuit breaker may provide a 48-Vdc output to an IED to indicate that the circuit breaker is closed. As another example, an IED monitoring synchrophasors may indicate an alarm condition to a motor protection IED by outputting a 250 Vdc signal to a binary input port of the motor protection IED.

In an example embodiment, an IED, such as a protective relay, includes a plurality of binary input circuits to receive various binary inputs from various other IEDs within a system. Each binary circuit provides reinforced isolation of the DC or AC binary input voltages to an IED controller via an input protection subcircuit and an optocoupler. The IED may include a variety of other inputs for monitoring various components of the electric power system and/or various control and/or protection outputs, including binary signal outputs.

In many embodiments, the binary input ports on an IED may receive AC or DC binary input signals with voltage magnitudes between 0 Volts and 300 Volts. The binary input signals may allow for a relatively low current draw. The binary input circuits described herein are configured to have a sufficiently low power draw to allow for the binary input circuits to be powered by the binary input voltage itself. The input impedance of the circuit may be relatively low (e.g., less than approximately 200,000 Ohms) over a wide binary input voltage range. The relatively low input impedance reduces or eliminates parasitic capacitance charging due to external circuit leakages. Even when multiple binary output circuits drive a signal in parallel, each binary input circuit is immune to the combined binary output leakages of the paralleled binary out circuits due to the relatively low input impedance of the binary input circuit.

A first stage of each binary input circuit may be an input protection subcircuit to provide a first level of protection. For example, the input protection subcircuit may include transient voltage suppression, such as a transient voltage suppressor (TVS) or a metal oxide varistor (MOV). A voltage standardization subcircuit, such as a diode bridge rectifier, may provide a unipolar output voltage for any (either) polarity of the binary inputs. A voltage regulation subcircuit may provide a stable DC rail voltage to a duty cycle modulation subcircuit. The voltage regulation subcircuit may, for example, be a linear series regulator, a switching regulator, an SCR regulator, or the like. In one embodiment, a common drain amplifier, also known as a source follower, is used with the gate of the regulating transistor connected directly to the stable DC rail voltage and the source connected to the input of the linear series regulator.

The DC rail voltage may be referred to as a VCC voltage, but is not strictly limited to a positive supply voltage from a collector terminal of bipolar transistors. Rather the term VCC as it is used herein and as shown in the figures simply refers to the regulated positive DC voltage. Thus, the term could be substituted for a different term like, for example, VSS that is typically associated with the source terminal of a FET-connected DC rail.

The duty cycle modulation subcircuit pulse-width modulates the DC rail voltage to drive an optocoupler subcircuit. Any of a wide variety of pulse width modulation circuits may be utilized such as, for example, an op-amp based pulse width modulator with resistor dividers may be utilized. The various components described above, including the optocoupler can all be powered by the binary input voltage and so the universal binary input circuits described herein do not require an independent isolated power supply.

Some prior attempts at creating universal DC inputs have used digital isolators with basic isolation powered by the binary inputs themselves. These attempts succeeded at being powered by the binary inputs themselves, but failed to provide reinforced isolation. Other prior attempts at creating universal DC inputs have used digital isolators with reinforced isolation powered by independent isolated power supplies. These attempts succeeded at providing reinforced isolation, but require an independent isolated power supply.

When the voltage is relatively high, the duty cycle modulation subcircuit drives the optocoupler subcircuit with a relatively low duty cycle to maintain the total power consumption by the binary input circuit. When the voltage is relatively low, the duty cycle modulation subcircuit drives the optocoupler subcircuit with a relatively high duty cycle to maintain the total power consumption by the binary input circuit. In some embodiments, the first target range and the second target range may be the same or overlapping. In other embodiments, the first and second target ranges may be different but overlapping or may be different and non-overlapping.

The pulse-width modulation subcircuit reduces the power dissipation at high binary input voltages. In some embodiments, the pulse width modulation subcircuit may provide a duty cycle output that is nonlinearly correlated with the binary input voltage level (AC or DC). To provide a specific example, a nonlinear pulse width modulation subcircuit may modulate a 60 Vdc binary input with a 60% duty cycle, a 125 Vdc binary input with a 40% duty cycle, and a 250 Vdc binary input with a 30% duty cycle.

Thus, in some embodiments, the pulse width modulation subcircuit may modify the duty cycle based on the binary input voltage to maintain a relatively constant power consumption. In other embodiments, the pulse width modulation subcircuit achieves lower power dissipation at higher binary input voltages (e.g., 250 Vdc).

The optocoupler communicates the binary input signal with a controller (e.g., a microcontroller or FPGA) of the IED by illuminating a light emitting diode (LED). The optocoupler provides reinforced isolation between the binary input circuit and the controller of the IED. The input protection subcircuit provides transient overvoltage (surge) protection and may be configured to specifically satisfy one or more regulatory surge ratings and/or transient voltage suppression ratings, such as EN 60255-26:2013 Surge Zone A.

In some embodiments, batteries, capacitors, and/or external power sources may supplement or smooth the voltage provided by the binary inputs. An IED (e.g., a protective relay) may include one or more binary input circuits that each accommodate binary input voltages between 0 and 300 Volts (AC or DC) and reduce power consumption at high voltages. In some embodiments, adaptations may be made to accommodate even higher voltages.

In some embodiments, a digital isolator with low isolated side current requirements that provides reinforced isolation may be used instead of the optocoupler. In such an embodiment, the digital isolator circuit may provide the reinforced isolation and the pulse width modulation subcircuit may drive the digital isolator.

In some embodiments, the controller (e.g., microprocessor or FPGA) of the IED may implement pick-up and drop-out delays allowing for AC binary inputs. Other components of an AC binary input circuit may be similar to those described herein. In some embodiments, the AC inputs may be rectified. In other embodiments, the AC inputs may be used to directly drive the optocoupler and the controller of the IED may delay pick-ups and drop-outs based the polarity cycling of the AC signals to ensure that the polarity switching of the AC inputs does not result in false readings.

The embodiments of the disclosure can be further understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. For example, numerous rectification circuits and approaches for rectification are available and so are not described in detail herein. Furthermore, the described features, structures, or operations may be combined in any suitable manner in one or more embodiments. It is also appreciated that the components of the embodiments as generally described and illustrated in the figures herein could be arranged and designed in a wide variety of different configurations.

Several aspects of the embodiments described may be implemented as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor executable instructions.

FIG. 1 illustrates an example of an embodiment of a simplified one-line diagram of an electric power transmission and distribution system 100 in which a plurality of communication devices may facilitate communication in a network (e.g., a software defined network). The electric power delivery system 100 may be configured to generate, transmit, and distribute electric energy to loads. Electric power delivery systems may include equipment, such as electric generators (e.g., generators 110, 112, 114, and 116), power transformers (e.g., transformers 117, 120, 122, 130, 142, 144 and 150), power transmission and delivery lines (e.g., lines 124, 134, and 158), circuit breakers (e.g., breakers 152, 160, 176), busses (e.g., busses 118, 126, 132, and 148), loads (e.g., loads 140, and 138) and the like. A variety of other types of equipment may also be included in the electric power delivery system 100, such as voltage regulators, capacitor banks, and a variety of other types of equipment.

A substation 119 may include a generator 114, which may be a distributed generator, and which may be connected to a bus 126 through the step-up transformer 117. The bus 126 may be connected to a distribution bus 132 via a step-down transformer 130. Various distribution lines 136 and 134 may be connected to the distribution bus 132. The Distribution line 136 may lead to a substation 141 where the line is monitored and/or controlled using an intelligent electronic device (IED) 106, which may selectively open and close the breaker 152. A load 140 may be fed from the distribution line 136. Further step-down transformer 144 in communication with the distribution bus 132 via the distribution line 136 may be used to step down a voltage for consumption by the load 140.

The distribution line 134 may lead to a substation 151, and deliver electric power to the bus 148. The bus 148 may also receive electric power from the distributed generator 116 via the transformer 150. The distribution line 158 may deliver electric power from the bus 148 to the load 138, and may include further step-down transformer 142. A circuit breaker 160 may be used to selectively connect the bus 148 to the distribution line 134. An IED 108 may be used to monitor and/or control circuit breaker 160 as well as distribution line 158.

The electric power delivery system 100 may be monitored, controlled, automated, and/or protected using IEDs, such as IEDs 104, 106, 108, 115, and 170, and a central monitoring system 172. In general, IEDs in an electric power generation and transmission system may be used for protection, control, automation, and/or monitoring of equipment in the system. For example, IEDs may be used to monitor equipment of many types, including electric transmission lines, electric distribution lines, current transformers, busses, switches, circuit breakers, reclosers, transformers, autotransformers, tap changers, voltage regulators, capacitor banks, generators, motors, pumps, compressors, valves, and a variety of other types of monitored equipment.

As used herein, an IED (such as IEDs 104, 106, 108, 115, and 170) may refer to any microprocessor-based device that monitors, controls, automates, and/or protects monitored equipment within an electrical system. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

A common time signal may be distributed throughout the system 100. Utilizing a common or universal time source may ensure that IEDs have a synchronized time signal that can be used to generate time-synchronized data, such as synchrophasors. In various embodiments, the IEDs 104, 106, 108, 115, and 170 may receive a common time signal 168. The time signal may be distributed in the system 100 using a communications network 162 or using a common time source, such as a Global Navigation Satellite System ("GNSS"), or the like.

According to various embodiments, a central monitoring system 172 may comprise one or more of a variety of types of systems. For example, central monitoring system 172 may include a supervisory control and data acquisition (SCADA) system and/or a wide area control and situational awareness (WACSA) system. A central IED 170 may be in communication with IEDs 104, 106, 108, and 115. IEDs 104, 106, 108 and 115 may be remote from the central IED 170, and may communicate over various media such as a direct communication from the IED 106 or over a wide-area communications network 162. According to various embodiments, certain IEDs may be in direct communication with other IEDs (e.g., IED 104 is in direct communication with central IED 170) or may be in communication via a communication network 162 (e.g., IED 108 is in communication with central IED 170 via communication network 162).

Communication via a network 162 may be facilitated by networking devices including, but not limited to, multiplexers, routers, hubs, gateways, firewalls, and switches. In some embodiments, IEDs and network devices may comprise physically distinct devices. In other embodiments, IEDs and network devices may be composite devices, or may be configured in a variety of ways to perform overlapping functions. IEDs and network devices may comprise multi-function hardware (e.g., processors, computer-readable storage media, communications interfaces, etc.) that can be utilized in order to perform a variety of tasks that pertain to network communications and/or to operation of equipment within system 100.

Any of the various IEDs 104, 106, 108, and 115, breakers 152, 160, 176, generators 110, 112, 114, and 116, transformers 117, 120, 122, 130, 142, 144 and 150, and/or other devices and components of the system 100 may utilize DC binary inputs to make control, monitoring, and protection decisions. Accordingly, the presently described systems and methods for providing reinforced isolation of universal binary input voltages (e.g., 0 Vdc to 300 Vdc) with reduced power dissipation for high voltages may be implemented in conjunction with a wide variety of devices within an electric power delivery system. Thus, the examples of implementation within a protective relay are merely illustrative of one of the numerous possible implementations.

Figure 2:
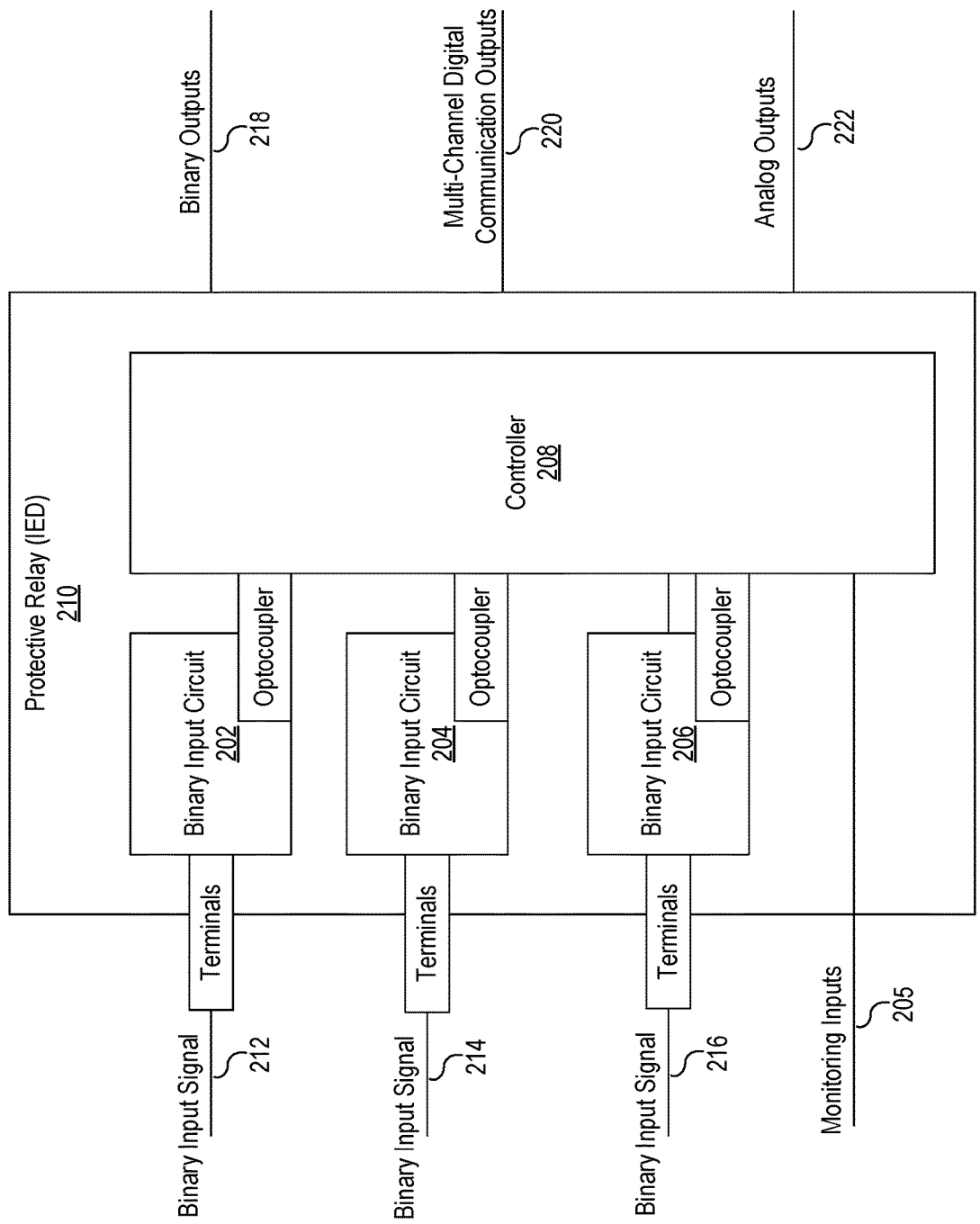
FIG. 2 illustrates an example of a simplified diagram of an intelligent electronic device (IED) with binary input signals received by terminals of binary input circuits.

FIG. 2 illustrates an example of a simplified protective relay 210 with a plurality of inputs 205, 212, 214, and 216 and outputs 218, 220, and 222. Binary input circuits 202, 204, and 206 may be configured to receive binary inputs 212, 214, and 216 from devices such as circuit breakers, reclosers, alarm systems, and other protective relays. These inputs may provide information such as, but not limited to, if a breaker is open, if a breaker is closed, if an alarm condition on a different protective relay has been met.

An IED may include a terminal block for the binary inputs that includes 2*N terminals, where N is the number of binary inputs. In such embodiments, each binary input is independently connected to the IED at two polarity insensitive terminals. In other embodiments, an IED may include a terminal block for the binary inputs that includes N+1 terminals, where N is again the number of binary inputs. In such embodiments, one wire of each binary input may be wired to a single common terminal.

Binary input circuits 202, 204, and 206 may communicate the state of the binary input to a controller 208 to aid the protective relay 210 in making a protective decision. The protective relay may respond and/or communicate via binary outputs 218, multi-channel digital communication outputs 220 (e.g. SCADA, TCP/IP, etc.), and/or analog outputs 222. Such a response may include, but is not restrained to: tripping a circuit breaker; opening or closing a recloser; or providing an alarm signal to another protective relay. Protective relays may have any number of binary input circuits.

A protective relay may include additional inputs, such as monitoring inputs 2015, and/or various other complex components that are not described herein to avoid obscuring the presently described systems and methods. In the illustrated embodiment, the monitoring binary input circuits 202, 204, and 206 may provide reinforced isolation of the binary inputs 212, 214, and 216 via input circuits (not shown) and optocouplers for providing electrically isolated communication with the controller 208.

Figure 3:
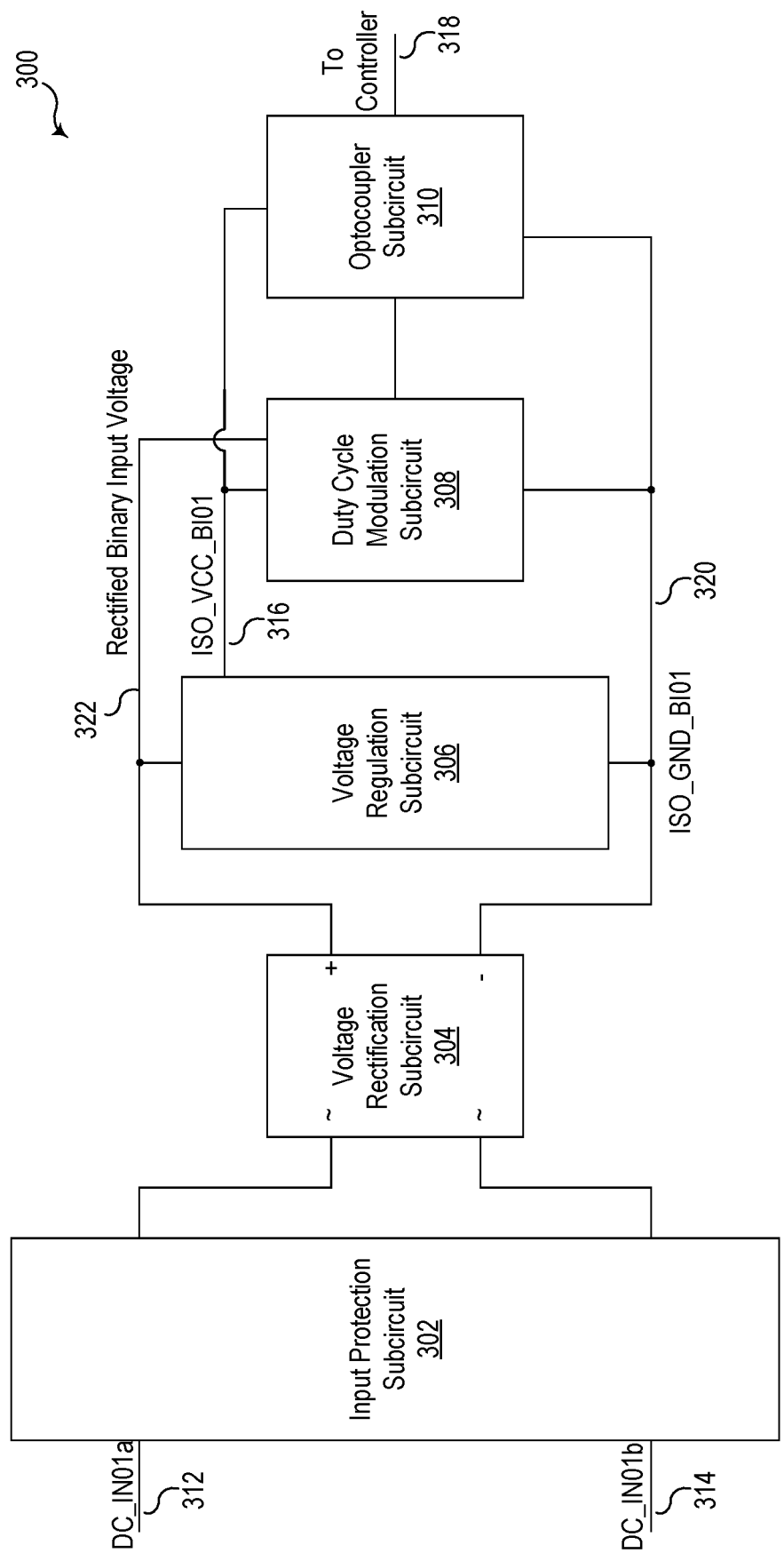
FIG. 3 illustrates an example of a functional block diagram of a binary input circuit with reinforced isolation.

FIG. 3 illustrates an example of a functional block diagram 300 of a binary input circuit consistent with the embodiments of the present disclosure. The binary input provided via inputs 312 and 314 powers the binary input circuit, circumventing the need for an isolated power supply. Binary input lines 312 and 314 provide a reference voltage for the subsequent circuitry, though in some embodiments, the ISO_GND_BI01 at 320 may be connected to a system ground.

A binary input circuit consistent with the embodiments of the present disclosure may be able to support both AC and DC binary input voltages with the addition of pickup and dropout timers implemented in subsequent electronics and/or in the controller, at 318. Thus, the descriptions of DC binary inputs throughout this disclosure may be applied to AC binary inputs with the addition of pick-up or drop-out timers, unless contextually or explicitly described otherwise.

A first stage of the binary input circuit is shown as an input protection subcircuit 302 that provides over-voltage protection from transient voltages and potentially other electrical disturbances. The input protection subcircuit 302 may utilize, for example, metal oxide varistors (MOVs) to provide transient voltage suppression. Input protection subcircuit 302 may be configured to facilitate, at least in part, compliance with EN 60255-26:2013 Surge Zone A requirements. Input protection subcircuit 302 may potentially include, but is not limited to, devices such as transient voltage suppressors, fuses, thermal protectors, diodes, and capacitors.

The voltage rectification subcircuit 304 may provide a unipolar supply voltage 322 (positive) and 320 (ground) for either polarity of DC inputs via inputs 312 and 314. The voltage rectification subcircuit 304 may, for example, include various diodes, transistors, capacitors, and the like. In some embodiments, voltage rectification subcircuit 304 may be, for example, embodied as a diode bridge rectifier or other voltage rectifying circuit.

The voltage regulation subcircuit 306 provides a DC input 316 to the duty cycle modulation subcircuit 308 and may regulate the positive 322 and negative or zero 320 voltages within the binary input circuit 300. Duty cycle modulation subcircuit 308 may pulse width modulate the DC input 316 and drive an optocoupler subcircuit 310. The optocoupler subcircuit 310 contains a light emitting diode (LED) that is driven by the output of the duty cycle modulation subcircuit 308.

FIG. 4A illustrates an example of a low duty cycle output 404 of a pulse-width modulation sub-circuit for driving an optocoupler based on a binary input with a relatively high voltage of approximately 250 Vdc. Specifically, the duty cycle of output 404 is approximately 20%, meaning that for each period the signal is high 20% of the time and low for 80% of the time.

FIG. 4B illustrates an example of a high duty cycle output 408 of a pulse-width modulation sub-circuit for driving an optocoupler based on a binary input with a relative low voltage. The duty cycle of output 408 may be, for example, approximately 80%. Lower voltages may generally have longer duty cycles while higher voltages may generally have shorter duty cycles. The relationship between voltage magnitude and duty cycle may be linear or nonlinear for voltage ranges between 0 Vdc and 300 Vdc and for duty cycles between approximately 0% and approximately 100%.

Figure 5:
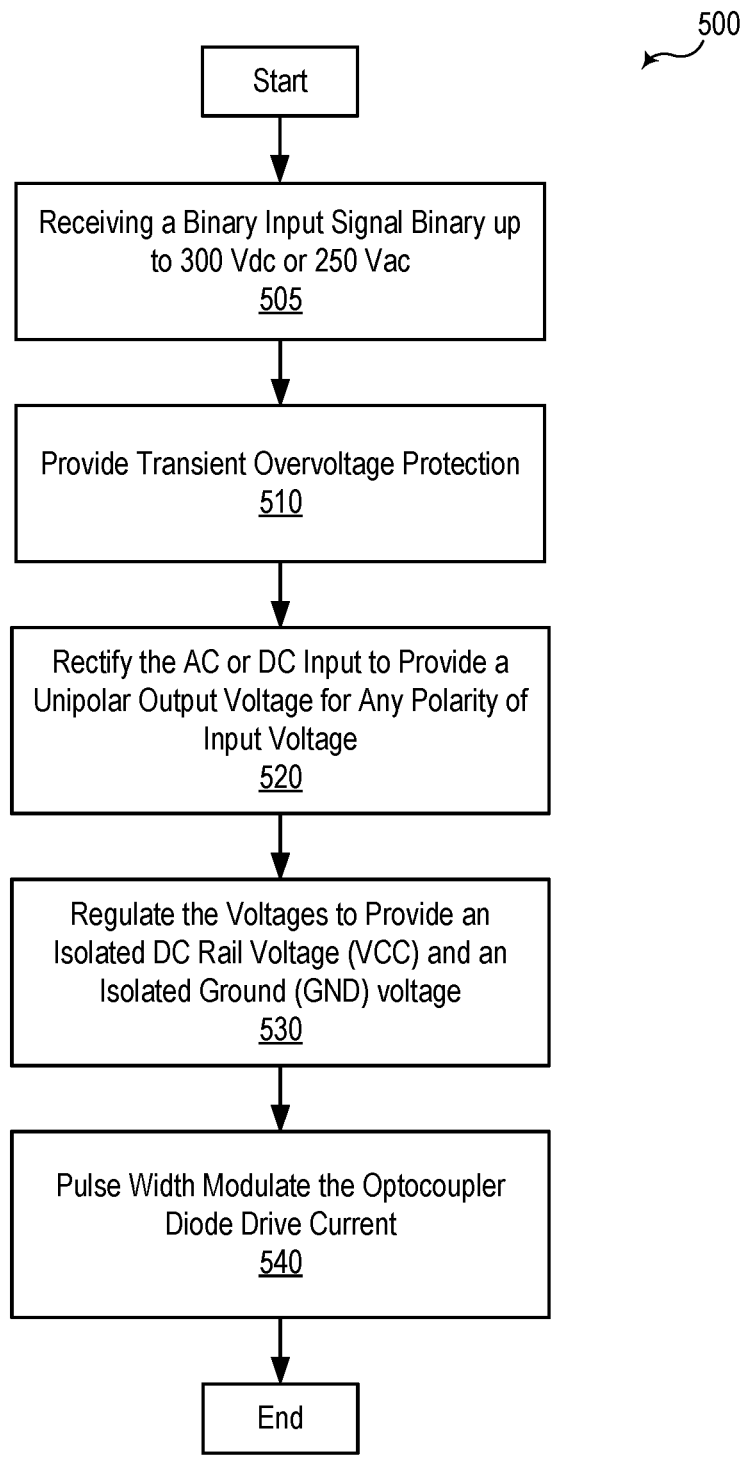
FIG. 5 illustrates a method for providing a binary input signal to a controller via a pulse-width modulated optocoupler to provide reinforced isolation with decreased power consumption at higher voltages.

FIG. 5 illustrates a method 500 for providing a binary input signal to a controller via a pulse-width modulated optocoupler to provide reinforced isolation with decreased power consumption at higher voltages. A universal AC or DC binary input circuit receives, at 505, a binary input signal between approximately 0 Vdc and 300 Vdc. The binary input may be polarity insensitive. For example, the binary input may comprise a two-terminal input for receiving a binary input represented by the voltage difference applied to the two terminals. The applied voltage difference between the two-terminals is polarity insensitive in that either terminal may receive the positive and/or negative inputs. As previously described, an initial level of protection from transient voltages may be provided by an input protection subcircuit, at 510.

A rectification subcircuit may rectify, at 520, the AC or DC input to provide a unipolar output voltage for any polarity of input voltage. A voltage regulation subcircuit may regulate, at 530, the DC rail voltage and the ground (or negative) voltage and provide the voltage to a pulse width modulation subcircuit. The pulse width modulation subcircuit may drive, at 540, the optocoupler subcircuit with a pulse width modulated signal (linearly or nonlinearly) that is inversely proportional to the voltage magnitude of the rectified input voltage. The optocoupler electrically isolates the controller from the optocoupler input and other components of the binary input circuit. No additional power supply is needed, much less an isolated power supply, to run the binary input circuit because the power is drawn exclusively from the binary input voltage.

Accordingly, a universal binary input circuit may receive and be powered by universal AC or DC binary inputs between 0 and 300 Volts, provide transient overvoltage input protection, provide reinforced isolation to a controller, and decreases power consumption for high voltage binary inputs. In some embodiments in which the binary input circuit is configured to receive AC binary inputs, the controller may implement delayed pick-ups and drop-outs for the received isolated binary input signals.

It is appreciated that many of the specifically described subcircuits may be logically or practically combined into a single subcircuit and/or some of the subcircuits may be logically or practically divided into sub-subcircuits. The functional block diagram and functional descriptions of each subcircuit are not necessarily required.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined to encompass the following claims.

What is claimed is:

1. A binary input circuit, comprising:
   an input port to receive a binary voltage input;
   an input protection subcircuit to provide overvoltage protection from the binary voltage input;
   a voltage rectification subcircuit to rectify the binary voltage input to provide a rectified supply voltage;
   a voltage regulation subcircuit to receive the rectified supply voltage and generate a regulated direct current (DC) voltage for pulse width modulation; and
   a duty cycle modulation subcircuit to pulse width modulate the regulated DC voltage to generate a drive signal to drive an optocoupler, wherein the drive signal is inversely and nonlinearly proportional to the regulated DC voltage to decrease power dissipation as the regulated DC voltage increases.

2. The binary input circuit of claim 1, wherein the voltage regulation subcircuit comprises one of a linear series regulator, a switching regulator, and transistor-based regulator.

3. The binary input circuit of claim 1, wherein the binary voltage input comprises a direct current (DC) binary voltage input.

4. The binary input circuit of claim 1, wherein the binary voltage input comprises an alternating current (AC) binary voltage input.

5. The binary input circuit of claim 1, wherein the input port is polarity insensitive and configured to receive the binary voltage input with a voltage magnitude between approximately 0 Vdc and 300 Vdc.

6. The binary input circuit of claim 1, wherein the input port comprises a two-terminal binary input port.

7. The binary input circuit of claim 1, wherein the input port is connected in common mode with a plurality of other binary input ports.

8. The binary input circuit of claim 1, wherein the binary voltage input received by the input port is used to power the duty cycle modulation subcircuit.

9. The binary input circuit of claim 1, wherein the input protection subcircuit comprises a metal oxide varistor (MOV) to provide transient voltage suppression.

10. The binary input circuit of claim 1, wherein the voltage rectification subcircuit comprises a diode bridge rectification circuit.

11. The binary input circuit of claim 10, wherein the voltage rectification subcircuit is configured to rectify one of an alternating current (AC) binary input and a direct current (DC) binary input.

12. The binary input circuit of claim 1, wherein the duty cycle modulation subcircuit comprises an operational amplifier.

13. An intelligent electronic device (IED) of an electric power system, comprising:
    an input protection subcircuit to provide over-voltage protection from a received binary voltage input;
    a voltage rectification subcircuit to rectify the binary voltage input to provide a rectified supply voltage;
    a voltage regulation subcircuit to receive the rectified supply voltage and generate a regulated direct current (DC) voltage for pulse width modulation;
    a duty cycle modulation subcircuit to pulse width modulate the regulated DC voltage to generate a drive signal to drive an input of an optocoupler, wherein the drive signal is inversely and nonlinearly proportional to the regulated DC voltage to decrease power dissipation as the regulated DC voltage increases; and
    a controller to:
      receive an output signal from the optocoupler, and
      determine a protective action based on the received output signal from the optocoupler.

14. The IED of claim 13, wherein the duty cycle modulation subcircuit is configured to pulse width modulate the regulated DC voltage with a duty cycle linearly inversely proportional to the voltage magnitude of the rectified supply voltage.

15. The IED of claim 13, wherein the duty cycle modulation subcircuit is configured to pulse width modulate the regulated DC voltage with a duty cycle nonlinearly inversely proportional to the voltage magnitude of the rectified supply voltage.

16. The IED of claim 13, wherein the input protection subcircuit comprises at least one of a transient voltage suppressor (TVS) and a metal oxide varistor (MOV) to provide transient voltage suppression.

17. A method of providing an intelligent electronic device (IED) with reinforced isolation from a binary voltage input via a binary input circuit, comprising:
    receiving, via a binary input port of the binary input circuit, a binary input voltage between approximately 0 and 300 volts;
    protecting the binary input circuit from binary input over-voltages via an input protection subcircuit;
    rectifying the binary input voltage to produce a rectified DC voltage;
    regulating the rectified DC voltage to produce a regulated DC voltage;
    pulse width modulating the regulated DC voltage to generate a pulse width modulated drive signal;
    driving a light emitting diode of an optocoupler with the pulse-width modulated drive signal, wherein the drive signal is inversely and nonlinearly proportional to the regulated DC voltage to decrease power dissipation as the regulated DC voltage increases; and
    receiving, via a controller of the IED, an output signal from the optocoupler.

18. The method of claim 17, wherein the binary voltage input comprises a direct current (DC) binary voltage input.

19. The method of claim 17, wherein the binary voltage input comprises an alternating current (AC) binary voltage input.

20. The method of claim 17, further comprising using the binary input voltage to power a pulse width modulator to perform the pulse width modulation.

* * * * *